June 12, 1923.

H. V. SOUDERS

ROTARY VALVE

Filed April 30, 1920

WITNESSES
Howard D. Ort.
F. T. Chapman.

Herbert V. Souders, INVENTOR,

BY E. G. Siggers

ATTORNEY

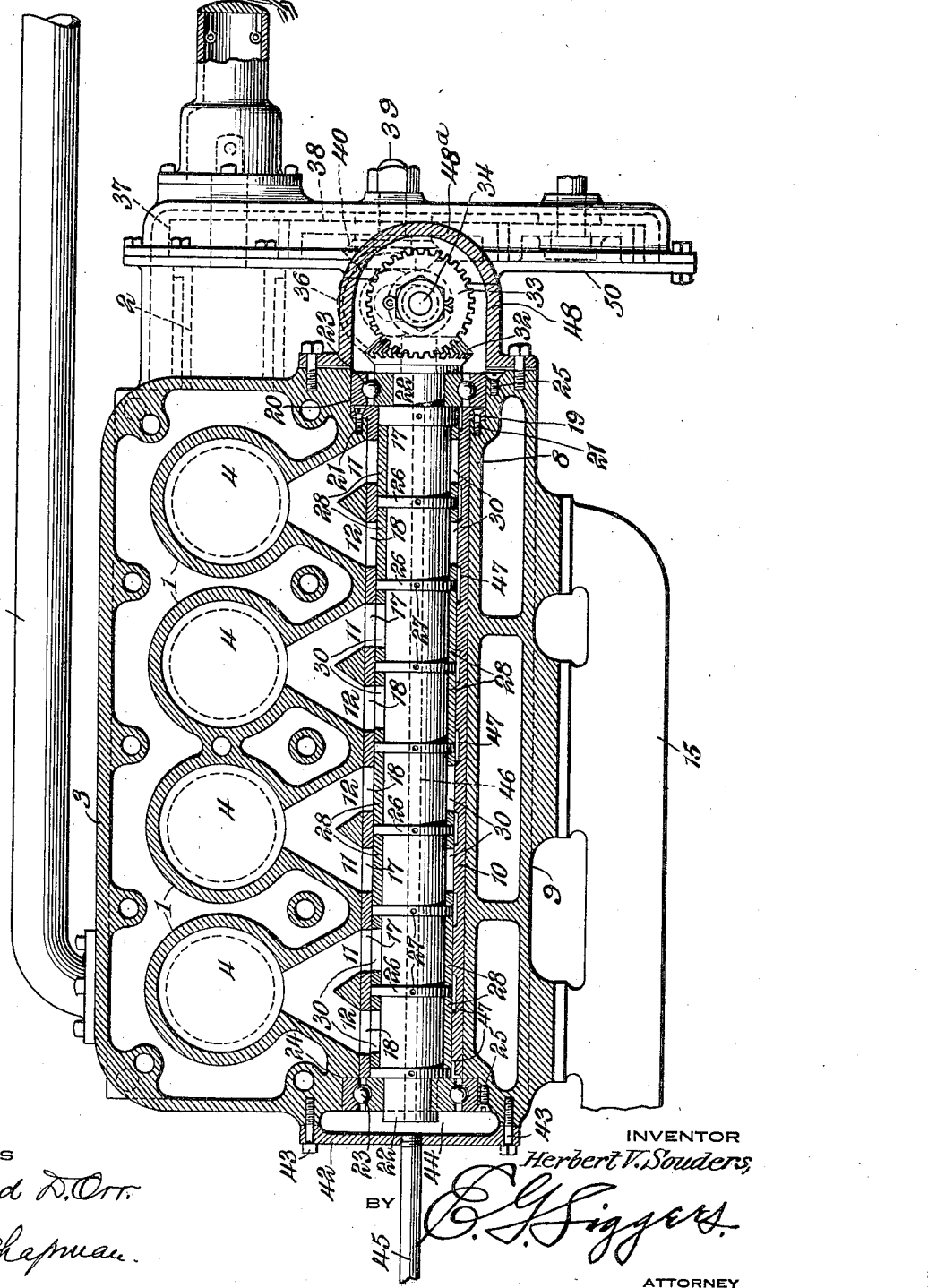

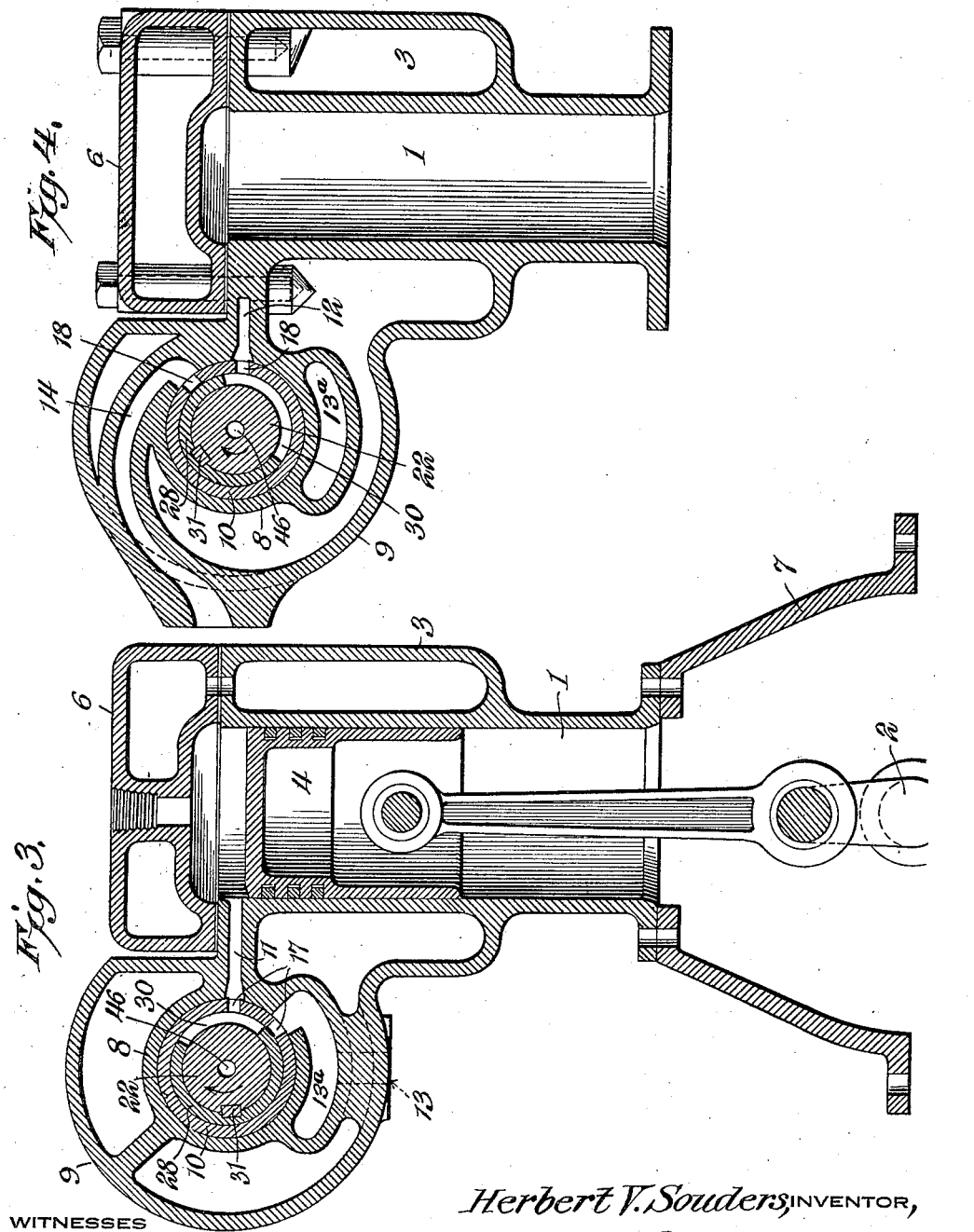

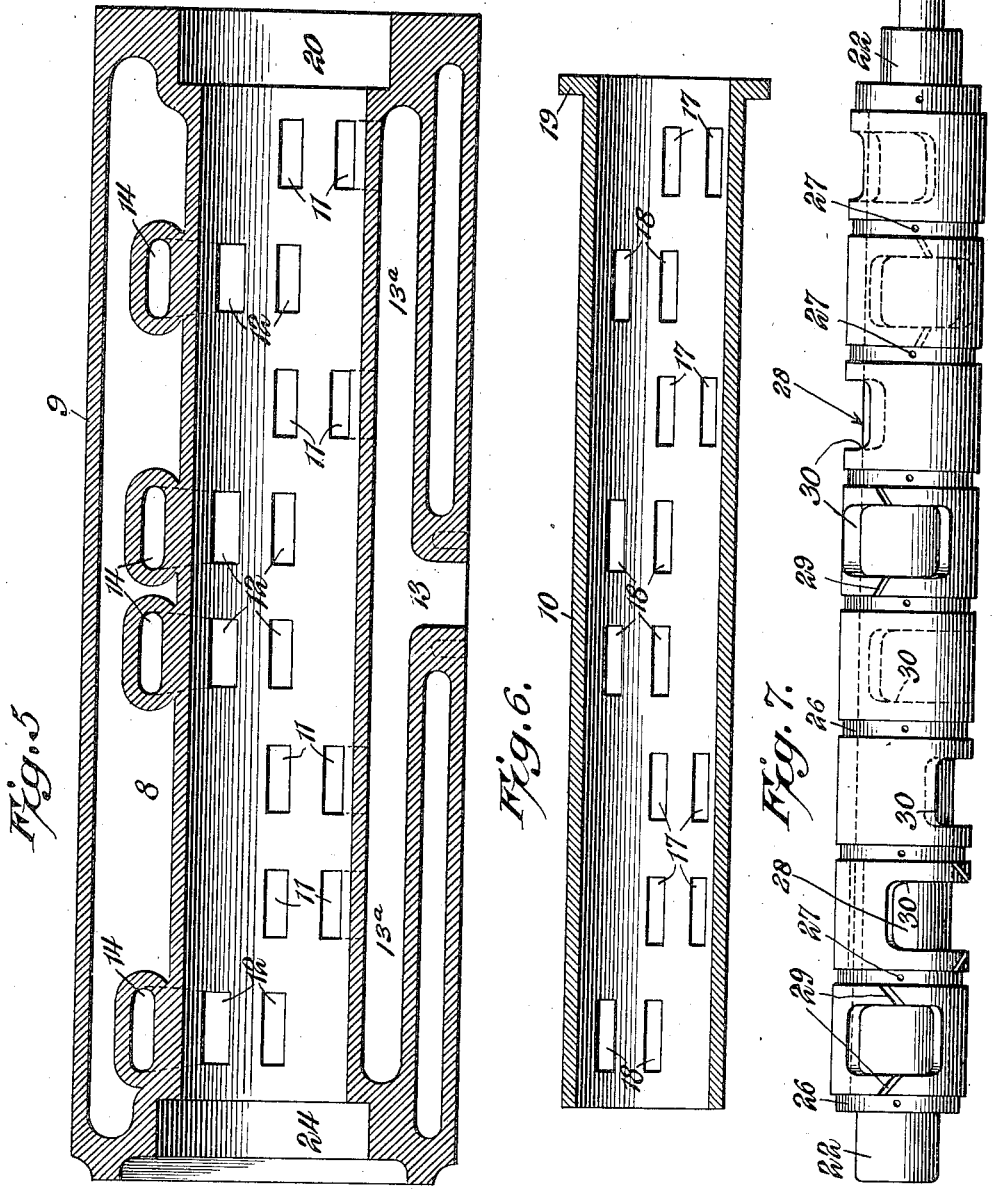

Patented June 12, 1923.

1,458,557

UNITED STATES PATENT OFFICE.

HERBERT V. SOUDERS, OF WILMINGTON, CALIFORNIA.

ROTARY VALVE.

Application filed April 30, 1920. Serial No. 377,903.

*To all whom it may concern:*

Be it known that I, HERBERT V. SOUDERS, a citizen of the United States, residing at Wilmington, in the county of Los Angeles and State of California, have invented a new and useful Rotary Valve, of which the following is a specification.

This invention has reference to rotary valve structures for explosion engines and its object is to materially reduce the working parts and thus correspondingly reduce the cost of manufacture, and also to largely increase the efficiency of the engine and diminish carbon deposits and other troubles.

In accordance with the invention the valve housing is cast in one piece with the cylinders, and the rotary valve forming part of the invention is mounted in a bushing in turn mounted in the valve housing. The port openings in the casting are larger than the ones machined in the bushing, thus insuring against any lapping of ports when the bushing is installed. The invention reduces replacements to a minimum so that the only replacements demanded because of wear are the bushing and a number of rings equal to double the number of pistons in the engine. This permits timing to be accomplished by properly placing the rings on the valve shaft and the shaft and rings are then placed in the bushing. Provision is made for an engine head to give access to the pistons and explosion chambers for the ready removal of carbon deposits. The invention eliminates the necessity of valve grinding as the rings controlling the entrance and exit of gas wear in tighter on use, the same as piston rings. Moreover, noisy parts, such as a cam shaft, push rods, push rod housing, valve tappets and the like, are done away with, thus avoiding many troubles and noises occurring in ordinary valve motions.

The invention will be best understood from a consideration of the following detailed description taken in connection with the accompanying drawings forming part of this specification, with the understanding, however, that the invention is not confined to any strict conformity with the showing in the drawings, but may be changed and modified so long as such changes and modifications mark no material departure from the salient features of the invention as expressed in the appended claims.

In the drawings,

Fig. 2 is a section on the line 2—2 of Fig. 1 with some parts omitted.

Fig. 3 is a vertical section through one of the cylinders showing one position of the valve motion.

Fig. 4 is a similar view but showing another position of the valve structure.

Fig. 5 is a substantially horizontal section through the valve casing.

Fig. 6 is a longitudinal diametric section through the valve bushing.

Fig. 7 is a plan view of the rotary valve removed from the engine.

Figure 1:
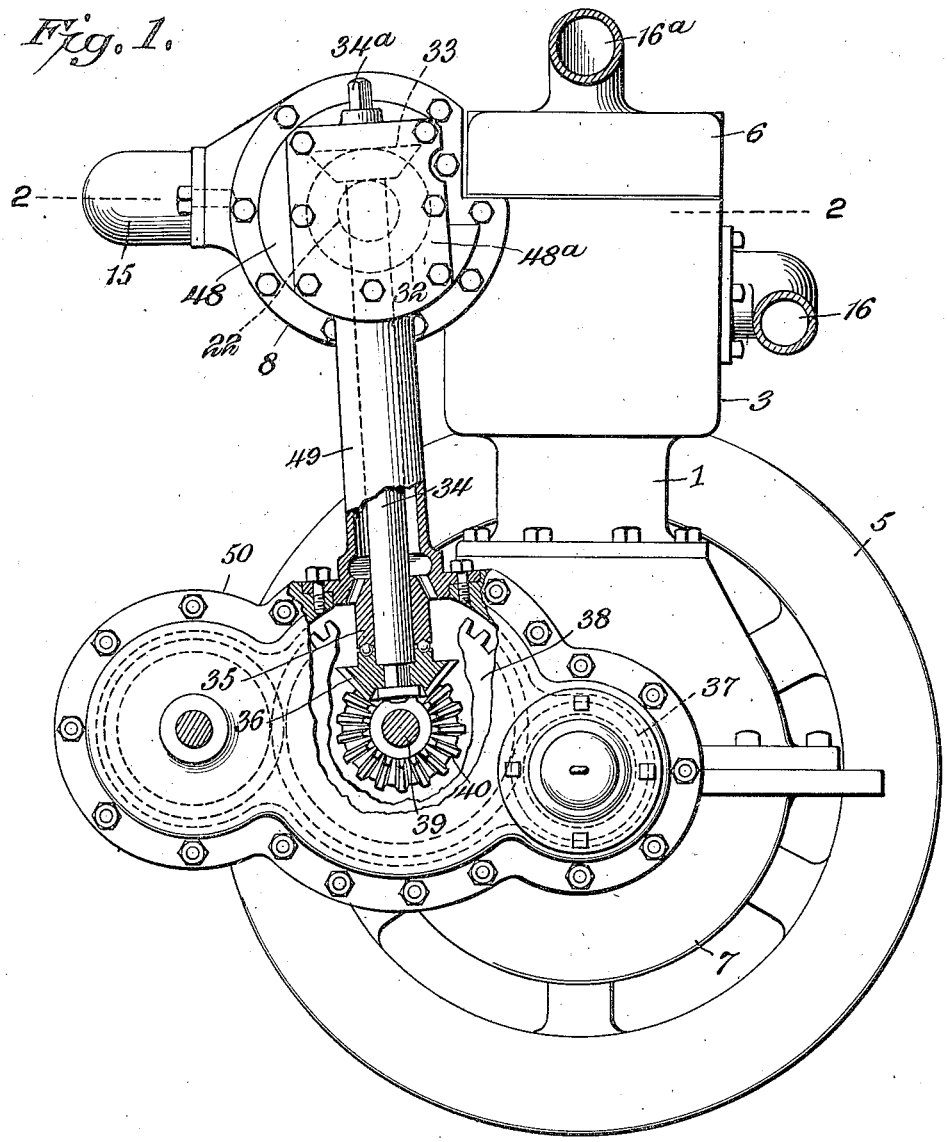
Fig. 1 is an end elevation, with some parts in section, of an explosion engine equipped with the invention.

The explosion engine, in common with many explosion engines, comprises cylinders 1, a crank shaft 2, a water jacket 3, for the cylinders, pistons 4, a fly wheel 5, shown in Fig. 1, a cylinder head 6 and a crank case 7, all of which need not differ essentially from like parts of multi-cylinder engines. The showing of the drawings is that of a four-cylinder engine, but it is to be understood that the engine may include a greater or less number of cylinders, the nature of the invention remaining the same in all instances.

At one side of the engine cylinder casting is a valve housing 8 which may be, but is not necessarily, in one piece with the cylinder block. The valve casting 8 is provided with a water jacket 9 and extending through the bore of the valve casing is a bushing 10. The valve casing 8 is shown separately in Fig. 5, and in the walls of the valve casing are pairs of intake ports 11 and exhaust ports 12.

The intake ports 11 communicate through a port 13 with an intake manifold, not shown, and which may be considered as arranged to receive fuel from a carbureter, also not shown. The port 13 is extended lengthwise of the valve housing 8, as shown at 13ª, and communicates with all the ports 11 so as to feed them. The exhaust ports 12 communicate with ducts 14 permitting the proper disposition of the products of combustion through an exhaust manifold 15 (see Figs. 1 and 2). The water jackets are provided with an inlet water pipe 16 and an outlet water pipe 16ª.

Fitted in the housing 8 is the valve bushing 10 already referred to and shown separately in Fig. 6. This bushing has pairs of ports 17 and 18, respectively, matching the ports 11 and 12, but accurately machined, while the ports 11 and 12 are simply cored out in the casting but larger than the ports 17 and 18 so as to prevent liability of overlapping and consequently throttling in the assembly and thereby providing for facility of manufacture, since the accurate work need only be performed in the sleeve or bushing 10 instead of in the valve housing, which latter is more difficult to handle. At one end of the bushing 10 there is formed a radial circular flange 19 seating in a cylindrical rabbet 20, in which the flange 19 may be secured by screws 21, or in any other suitable manner holding the bushing against displacement.

Extending axially through the bushing 10 is a valve shaft 22, shown with certain parts carried thereby, in Fig. 7, but removed from the bushing. The shaft 22 is mounted at the ends in anti-friction bearings 23, one seated in the counterbore 20 against the flange 19, and the other seated in another counterbore 24 at the other end of the valve casing. The anti-friction bearings 23, which may be of known type, are held in seats in the counterbores 20 and 24 by set screws 25. It is to be understood that the particular anti-friction bearings, and the manner of setting them and holding them in place, may be varied quite markedly without departing from the invention since such arrangements are common and well known.

The shaft 22 is provided with spaced separators 26 and through each separator is an oil hole 27. Between the separators, or spacers, 26 the shaft has mounted thereon valve rings 28, each having diagonal cuts, or slits, 29 and a cavity 30 extending part way circumferentially of the ring and stopping short of either side thereof. The rings 28 are held fixedly on the shaft 22 in appropriate positions each by means of a key 31, or in any other suitable manner, so that rotation of the shaft 22 causes the simultaneous rotation in proper timed relation of all of the rings 28 within the bushing 10.

At one end of the valve shaft 22 there is secured a beveled gear wheel 32 meshing with another beveled gear wheel 33 on a substantially upright shaft 34 extending at its lower end through a journal bearing 35 and below the journal bearing carrying a beveled gear wheel 36. As is customary in explosion engines the crank shaft carries a gear wheel 37 meshing with another gear wheel 38 on a countershaft 39 geared to the shaft 34 through a beveled gear 40 and the beveled gear 36 so that the rotary valve receives motion from the crank shaft through the gears 37, 38, 40 and 36, the shaft 34 and the gears 32 and 33.

The end of the shaft 22 remote from the gears 32 is covered by a plate 42 made fast to the corresponding end of the valve casing by screws 43, or in any other suitable manner. This produces a small chamber 44 into which lubricant may be fed by a pipe 45, or in any other appropriate manner. The lubricant then flows through an axial passage 46 through shaft 22 finding its way by the holes 27 in the ribs 26 to the spaces between the rings 28 and by way of slots 47 machined in the wall of the bushing 10 past the ribs 26. All this provides lubricant for the valve rings and, ultimately, the lubricant passes beyond the end of the valve shaft on which the gearing 32 is mounted and into the casing 48 inclosing the gears 32 and 33. Communicating with the casing 48 is a substantially upright tubular extension 49 thereof dropping to and stopping at another portion 50 serving to inclose part of the timing gear and communicating with the crank case 7.

The casing 48 has a cap plate 48ª giving access to the gears 32 and 33 so that such gears are accessible for examination and adjustment in timing the gearing. From the showing of this cap plate in Fig. 2 it will be seen that it is bowed or rounded in more or less conformity with the gear wheel 33.

The shaft 34 is continued upwardly through the tube 49 and through the top of the casing 48 and is provided with a square end 34ª, or other appropriate means to attach an appropriate portion of a distributor such as is commonly used on explosion engines but is not shown in the drawings since the construction of such a distributor is well known.

The lubrication of the engine may be by the splash system and hence the system of lubrication need not be further described than has already been described.

By casting the engine cylinders, water jacket and valve casing in one piece and then arranging for the accurate fit of the rotary valve with respect to the inlet and exhaust ports through the intermediary of a ported bushing, which may be accurately machined to save machining of heavier parts, and, by the employment of the rotary valve in place of poppet valves, a large number of moving parts with attendant expense of construction and noisy action, renders the engine of the invention easy and cheap to manufacture and assemble and free from many noises which are inherent in the ordinary valve arrangements.

The rings 28 serving as rotary valves have advantages in eliminating noisy parts and reducing the number of working parts to a minimum and, the rings being sprung into place and having an expansive tendency toward the inner wall of the bushing, maintain a tight fit when once worn into place, so that there is practically no leakage to the detriment of the lubricant and the accumulation of carbon. Nothing can get under the valve seats for each ring is always in the same place and never leaves its seat. The opening and closing of the ports is quick as a full opening is had in about 12 degrees of piston travel. For example, the exhaust port starts to open before the piston has completed its power stroke by 36 degrees (or about ½" of piston travel) wherefore the full exhaust opening is reached by the time the piston has completed its power or firing stroke and remains fully open until the piston comes within about 12 degrees of the completion of its exhaust stroke and then starts to close, and is closed, when the full exhaust stroke is completed.

The valve shaft is easy to dismantle and will get plenty of lubricant. Very little of such lubricant can get into the cylinders owng to the location of the branch oil holes and the oil grooves, the former being located between the ports and rings and the latter being located opposite the ports to the cylinders. The access of a small amount of lubricant to the cylinders is a good fault.

When the valve structure is assembled, the bushing 10, which is accurately machined, is introduced in the housing 8, and is there made fast by the screws 21 in properly adjusted position, and the charges are fed to the cylinders by way of respective ports 11 and cavities 30 in the sleeves or valve rings 28 to other ports 11 and into the cylinders while the exhaust finds its way by the ports 12 to other cavities 30 in the sleeves 28, thence to the outlet ducts 14 to the exhaust, the parts being all properly timed in operation.

The valve rings may be made differently from the showing of the drawings so long as the advantages of the valve ring construction are retained. The ring or cylindrical valves are split through the central portion of that part which is cut away to permit the passage of gas in and out, with the result that the split portion of the ring is about opposite a port of the bushing at the time of compression and firing and is on the port side only at the time when one or the other of the valves is open, for which reason there is no undue presssure at that time.

What is claimed is:

1. A rotary valve structure for explosion engines comprising a valve casing having ports cored therein, a bushing with ports machined therein and located within the casing, and a rotary valve in the bushing formed of a shaft located within the bushing and provided with a series of external valve rings fast to the shaft, with each ring having a cavity therein of which the shaft forms the bottom, and said shaft having an unbroken exterior face.

2. In a valve structure for explosion engines, a rotary valve comprising an elongated shaft with its exterior face unbroken, aligned rings thereon extending lengthwise of the shaft, with each ring having a cavity of which the shaft forms the bottom, and a bushing surrounding the rings and provided with pairs of ports, the circumferential distance between the outer walls of said ports being no greater than the circumferential length of the cavities in the rings.

3. In an explosion engine, a valve casing having pairs of inlet and exhaust ports and passages cored therein, said casing having a longitudinal bore, a bushing having ports registering with the inlet and exhaust ports secured in said bore, a cylindrical shaft movably mounted in said bushing, and a plurality of rings secured to and in contact with said shaft, and fitted within said bushing, each ring having an opening in its wall adapted to register with one pair of said ports during the movement of the shaft.

4. In an explosion engine, a valve casing having pairs of inlet and exhaust ports and passages cored therein, said casing having a longitudinal bore, a bushing having ports registering with the inlet and exhaust ports secured in said bore, a cylindrical shaft movably mounted in said bushing, and a plurality of rings secured to and in contact with said shaft, and fitted within said bushing, each ring having an opening in its wall forming a recess with the surface of the shaft as the bottom, said recess being adapted to register with one pair of said ports during the movement of the shaft.

5. In a multi-cylinder explosion engine, a valve casing having two pairs of ports for each cylinder to control admission and exhaust, a valve in said casing comprising a rotary shaft having a plurality of ported expansible rings fixed on the shaft to rotate therewith and forming a recess with the shaft as the bottom, there being two rings for each cylinder, each of said sleeves being adapted to coact with one pair of ports.

6. In a multicylinder explosion engine, a valve casing common to all of the cylinders and having an inlet and an exhaust passage communicating with each cylinder, said casing having a longitudinal bore and longitudinally spaced ports for said passages, a gas intake port leading from a source of supply, circumferentially spaced from each inlet port, an exhaust port to conduct gases away from said casing circumferentially spaced from each exhaust port from the cylinders, and a rotary valve controlling said ports comprising a shaft having a series of ported rings rigidly secured thereto and forming a cavity with the shaft forming the bottom, said rings being in position to effect proper timing of the intake and exhaust and in spaced relation on the shaft, there being one ring for each pair of circumferentially spaced ports, the port in each ring being adapted to register with both ports in the casing to permit gases to pass therethrough during the rotation of the shaft.

7. A multicylinder explosion engine provided with a single rotary valve structure including a valve casing having inlet and outlet ports in number corresponding to the sum of the inlet and outlet ports of the number of cylinders employed in the engine, and a rotary valve in the form of an elongated shaft having an unbroken exterior face and as many valve rings thereon as there are inlet and outlet ports in the valve casing, each ring having a passage therethrough providing a chamber or recess for passing the gas with the shaft constituting the bottom wall of the chamber or recess.

8. In a multicylinder explosion engine, the combination of a single valve structure for controlling the inlet and exhaust ports of all of the cylinders, said valve including a single rotary shaft, and a plurality of ported valve rings secured to rotate with the shaft and forming a bridging member with the shaft at the bottom, each of said rings cooperating with a pair of ports in the valve casing.

9. A multicylinder explosion engine including a single valve structure for both the inlet and exhaust of the engine cylinders and comprising a single rotatable member with a plurality of ported expansible rings secured for rotation therewith and forming a recess with the shaft as the bottom and each controlling a respective inlet or exhaust port.

10. An explosion engine comprising a multicylinder block and an extended valve casing constituting one casting, the valve casing being elongated lengthwise of the cylinder block and having inlet and exhaust ports for the several cylinders, a single ported bushing fast in the valve casing and provided with ports corresponding to those in said valve casing, and a single rotary valve mounted in the bushing and provided with as many expansively elastic valve rings as there are inlet and exhaust ports, each ring having a bridging chamber or cavity for connecting a supply or exhaust port with a respective cylinder.

11. In a rotary valve for explosion engines, a casing, a hollow shaft in the casing having a plurality of valve rings thereon, spacer members separating said rings, a chamber for lubricant being provided at one end of said shaft, said spacer members and shaft having registering ducts for lubricant to lubricate each of said valve rings, and means connecting said casing with the lubricating system of the engine.

12. In a rotary valve for explosion engines, a casing, a hollow shaft in the casing having a plurality of valve rings thereon, spacer rings separating said rings, a chamber for lubricant being provided at one end of said shaft, said spacer rings and shaft having registering ducts for lubricant to lubricate each of said valve rings, driving mechanism for said shaft at the end remote from the lubricant chamber, and a casing for said mechanism adapted to conduct lubricant supplied to the valve casing to the crank case of the engine and lubricate said driving mechanism.

13. In a valve mechanism for explosion engines, a valve casing, a hollow rotary valve shaft in the casing having a plurality of valve rings thereon, spacers separating said rings, ducts being provided in said spacers and said shaft, and means for connecting said hollow shaft with the lubrication system of the engine to supply lubricant to each of said rings through said ducts.

In testimony that I claim the foregoing as my own, I have hereto affixed my signature.

HERBERT V. SOUDERS.